(12) United States Patent
Momal

(10) Patent No.: US 8,672,066 B2
(45) Date of Patent: Mar. 18, 2014

(54) AGRICULTURAL VEHICLE AND METHOD OF OPERATION

(75) Inventor: Pascal Momal, Velizy Villacoublay (FR)

(73) Assignee: Claas Tractor S.A.S., Velizy-Villacoublay Cedex (FR)

(*) Notice: Subject to any disclaimer, the term of this patent is extended or adjusted under 35 U.S.C. 154(b) by 0 days.

(21) Appl. No.: 13/551,154

(22) Filed: Jul. 17, 2012

(65) Prior Publication Data
US 2013/0025949 A1 Jan. 31, 2013

(30) Foreign Application Priority Data
Jul. 27, 2011 (EP) .................................. 11006154

(51) Int. Cl.
*B60K 6/20* (2007.10)
*B60K 25/06* (2006.01)
*B60W 20/00* (2006.01)

(52) U.S. Cl.
USPC .................... 180/53.8; 180/53.5; 180/65.285; 475/5

(58) Field of Classification Search
USPC ........... 180/53.8, 53.1, 53.4, 53.5, 65.4, 65.3, 180/65.285, 65.21; 477/5, 6, 8; 475/5
See application file for complete search history.

(56) References Cited

U.S. PATENT DOCUMENTS

| 5,669,842 | A  | * | 9/1997  | Schmidt ............................ 475/5 |
| 5,847,470 | A  | * | 12/1998 | Mitchell .......................... 290/45 |
| 6,048,288 | A  | * | 4/2000  | Tsujii et al. ....................... 477/5 |
| 7,028,794 | B2 | * | 4/2006  | Odahara et al. ............ 180/65.25 |
| 7,311,627 | B2 | * | 12/2007 | Tarasinski .................. 180/65.22 |
| 8,494,712 | B2 | * | 7/2013  | Vasilescu ....................... 701/36 |
| 2003/0094317 | A1 | * | 5/2003 | Takizawa et al. ............ 180/53.8 |
| 2003/0162619 | A1 | * | 8/2003 | Rodeghiero et al. ............ 475/73 |
| 2009/0095549 | A1 | * | 4/2009 | Dalum et al. ............ 180/65.265 |
| 2009/0294191 | A1 | * | 12/2009 | Sheidler et al. ............ 180/65.31 |

FOREIGN PATENT DOCUMENTS

EP 492152 A1 * 7/1992
WO WO 2011010182 A1 * 1/2011

* cited by examiner

*Primary Examiner* — Drew Brown
(74) *Attorney, Agent, or Firm* — Michael J. Striker

(57) ABSTRACT

An agricultural vehicle includes an internal combustion engine, an electric machine for driving one powertrain and a number of devices selectively drivable by the powertrain. The powertrain has a first section associated to the internal combustion engine, a second section and a first clutch for coupling the first and second sections. The electric machine and at least one of the devices are associated to the second section.

12 Claims, 1 Drawing Sheet

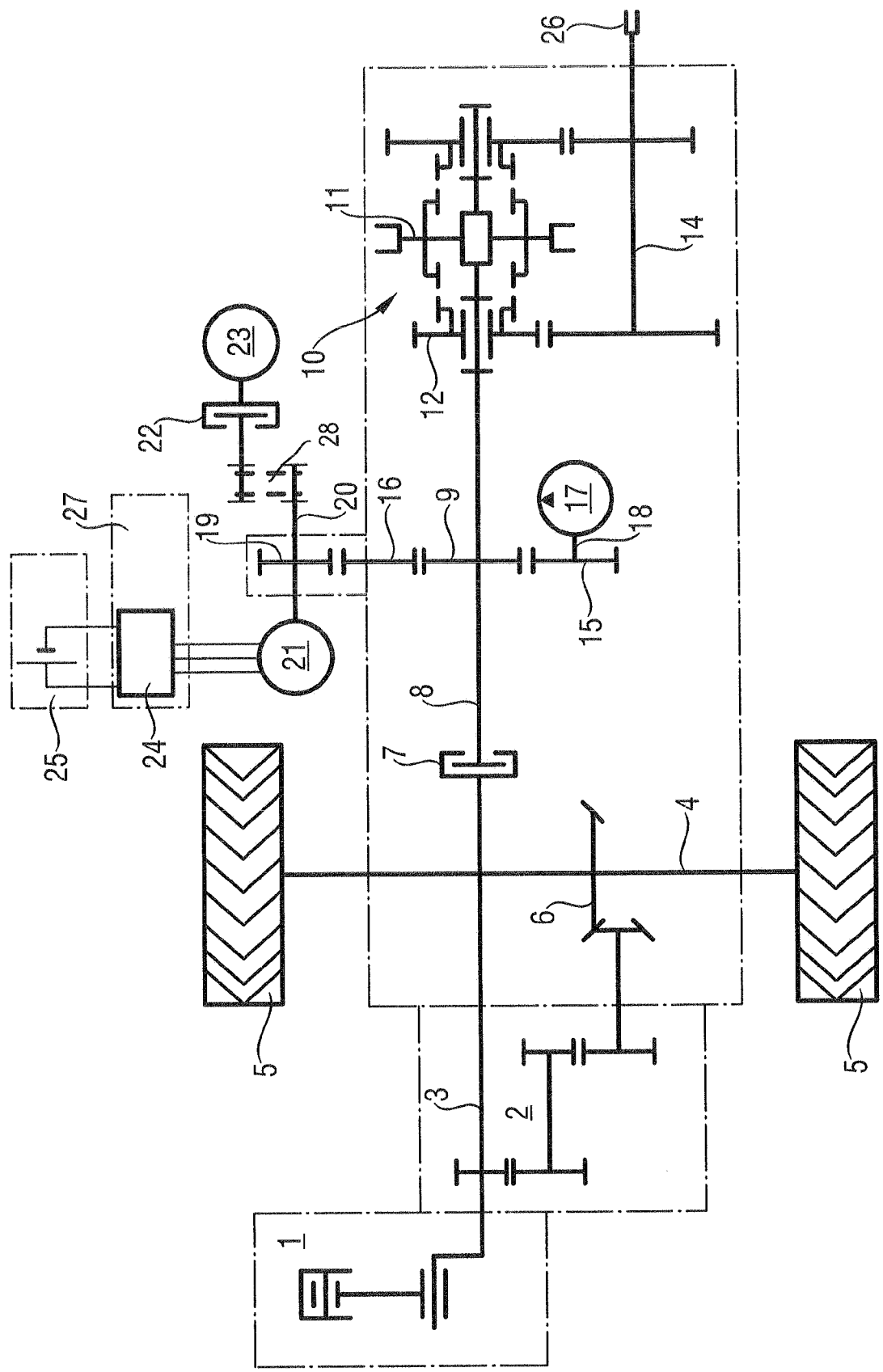

AGRICULTURAL VEHICLE AND METHOD OF OPERATION

CROSS-REFERENCE TO RELATED APPLICATION

The invention described and claimed hereinbelow is also described in European Patent Application EP 11006154.6, filed on Jul. 27, 2011. This European Patent Application, whose subject matter is incorporated here by reference, provides the basis for a claim of priority of invention under 35 U.S.C. 119(a)-(d).

BACKGROUND OF THE INVENTION

The present invention relates to an agricultural vehicle and a method of operation thereof.

Agricultural vehicles such as tractors, combine harvesters, forage harvesters and like have powerful internal combustion engines that are not operating continuously at their maximum rated power or at a fuel-efficient power level. It has been found that in only about 80% of the time such a vehicle and its driver spend working on a field a substantial amount of the engine power is indeed used. The remaining 20% of the time are spent waiting for other vehicles to finish their jobs, or in auxiliary activities such as maneuvering, coupling and uncoupling implements or trailers. All these activities require only a minute fraction of the power the internal combustion engine is capable of delivering.

Being optimized for high power operation, most internal combustion engines have mediocre efficiencies when running at low power, and considerable economies in fuel might be achieved if efficiency at low power could be improved.

SUMMARY OF THE INVENTION

The present invention overcomes the shortcomings of conventional operation of agricultural vehicles, such as those mentioned above.

To that end, the invention provides an agricultural machine which operates efficiently both at high and low power levels, and a method of operation therefore.

In an embodiment, the invention provides an agricultural vehicle comprising an internal combustion engine, an electric machine for driving one powertrain and a plurality of devices selectively drivable by the one powertrain. The powertrain comprises a first section associated to the internal combustion engine, a second section associated to the electric machine and to at least one of the plurality of devices and a first clutch for coupling the first and second section.

Preferably, the at least one device is a low power device which is likely to be used in a waiting state of the vehicle or in auxiliary operations, so that it can be operated driven by the electric machine operating as a motor while the internal combustion engine is off. By switching off the internal combustion engine when power demand is low, operation of the combustion engine at an inefficient power level can be avoided.

According to an embodiment of the invention, the at least one device is an air conditioning unit. The invention thus allows maintaining the air condition unit working while the vehicle is waiting, so that a comfortable temperature may be maintained in a driver cabin of the vehicle, although its internal combustion engine may not be working.

According to another embodiment of the invention, the at least one device is a hydraulic pump. Such a pump may be used advantageously for driving a lifting unit, in particular for lifting an implement or a trailer, in order to couple it to the vehicle.

According to another embodiment, the at least one device is a power take-off shaft. In field operation, such a shaft is conventionally used for driving an implement carried by the agricultural vehicle, and the power transmitted by it is a substantial fraction of the total power delivered by the internal combustion engine. However, in auxiliary operations such as coupling and uncoupling the implement, it may be necessary to rotate the power take-off shaft by a small angle in order to bring a terminal connector of the power take-off shaft into an orientation in which it can be coupled to a drive shaft of the tool. Obviously, this rotation requires only a minute fraction of the power the internal combustion engine could deliver, and energy is saved by leaving the internal combustion engine switched off in such a situation and using the electric machine as a motor to drive the power take-off shaft.

Evidently, the above-identified embodiments are combinable by associating two or more devices selected among an air conditioning unit, a hydraulic pump and a power take-off shaft to a second section of the powertrain.

Preferably, the powertrain further comprises a second clutch which delimits first and second subsections of said second section, where the first clutch and the electric machine are associated to the first subsection and the at least one device is associated to the second subsection. In this way, the electric machine is connected to the internal combustion engine, in particular for operation as a motor that assists the internal combustion engine in driving the powertrain, while the second subsection and the device associated to it are idle.

One of the devices drivable by the powertrain should be a wheel shaft. Since vehicle locomotion usually requires a substantial portion of the power of the internal combustion engine, the wheel shaft is preferably associated to the first section. In this way, the wheel shaft is driveable by the internal combustion engine regardless of whether the first clutch is open or closed.

Preferably, the electric machine is also operable as a generator driven by the powertrain, so that at a given time the electric machine generates the electric energy that will be needed for its operation later on.

In order to minimize the impact of electric power generation on the load of the internal combustion engine, a controller is provided for operating the electric machine as a generator, whenever the vehicle is in a brake mode. The brake mode may involve operation of friction brakes or an engine brake mode. In either case, the electric machine will have a decelerating effect that contributes to the braking action and converts into electric energy part of the kinetic energy of the vehicle that would otherwise be lost.

Further, an electric power outlet is provided that is powered by the electric machine. The electric power outlet can be used for operating electric appliances of various types.

The invention also provides a method of operating an agricultural vehicle as described above. The method includes driving an electric generator (which, preferably but not necessarily in the above-described electric machine) by means of the internal combustion engine, storing electrical energy from said generator in a battery and driving said at least one device using the electric machine while the internal combustion engine is off.

BRIEF DESCRIPTION OF THE DRAWINGS

Further features and advantages of the invention will become apparent from the description of embodiments that follows, with reference to the attached figures, wherein:

FIG. 1 is a block diagram of a tractor according to the present invention.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

The tractor of FIG. 1 comprises an internal combustion engine 1, a gearbox 2 connected to the internal combustion engine by a drive shaft 3, and wheel shafts 4 with wheels 5, at least one of which wheel shafts 4 is driven via gearbox 2 and a differential gear 6.

The drive shaft 3 extends straight through gearbox 2 to a primary member of a first friction clutch 7. A secondary member of clutch 7 is mounted at the end of a secondary shaft 8 which carries a gearwheel 9 and extends through a second gearbox 10. The second gearbox 10 is depicted in an idle state. By displacing a dog clutch 11 of the second gearbox 10 to the left or right along shaft 8, one of gearwheels 12, 13 is locked to the secondary shaft 8, so as to drive a power take-off shaft 14 at a first or second transmission ratio.

The gearwheel 9 is engaged with two other gearwheels 15, 16. Gearwheel 15 drives a hydraulic lubricant pump 17 through a shaft 18. There is no clutch between the secondary shaft 8 and the shaft 18, so that whenever the secondary shaft 8 rotates, the pump 17 is driven. By means of a hydraulic valve, not shown, at the output of pump 17, the output pressure of pump 17 can be switched between a low level, appropriate for feeding lubricant to bearings of the tractor, and a high level, appropriate for driving hydraulic pistons of a lifting device. Such a lifting device, for example, may comprise a three point hitch or three point linkage, which is conventionally used for attaching a plough, a harrow, a counterweight or other implements to rear and/or front ends of a tractor.

The gearwheel 16 drives a gearwheel 19 mounted on a layshaft 20, along with an electric machine 21. A belt drive 28 and a second friction clutch 22 connect layshaft 20 to a compressor 23 of an air conditioning unit which controls the temperature in a driver cabin of the tractor.

An electric converter 24 is connected between the electric machine 21 and a battery 25. The electric machine 21 is operable as a motor, powered by electric energy from the battery 25, or as a generator charging the battery 25, depending on the mode of operation of the converter 24.

When the electric machine 21 is in generator mode, the electric energy provided by it can be made available to electric appliances of various types by an electric power outlet, not shown, e.g., of the type conventionally used in buildings for two- or three-phase AC electric power. Such a power outlet may be provided in particular inside or close to the driver cabin, so as to enable, e.g., operation of a vacuum cleaner within the driver cabin. Further, a power outlet can advantageously be provided at a rear or the side of the tractor body, in order to provide electric power to an implement coupled to the tractor.

If the power outlet is directly connected to the electric machine 21, in parallel to converter 24, it may be useful to provide a generator operating mode for internal combustion engine 1, in which its speed is controlled so that 50 Hz or 60 Hz AC power is directly output by electric machine 21. Else, a second converter may be needed, so that electric power from electric machine 21 is first converted into DC by converter 24, and then into 50 Hz or 60 Hz AC by the second converter. Of course, alternatively, DC power from converter 24 might be supplied to the power outlet.

While the tractor is not moving, the internal combustion engine 1 may be switched off, and clutch 7 is open. Electric machine 21 then functions as a motor which drives the compressor 23, keeping the driver cabin cool while the driver has to wait for some other machine to finish its job on the field he is going to work on.

While the electric machine 21 is working as a motor, the input shaft 18 of the hydraulic pump 17 is rotating, too. But as long as the output pressure of pump 17 is at the low level, the load imposed on electric machine 21 by pump 18 is small. On the other hand, if the output pressure is set at the high level, the electric machine 21 can be used for powering the three-point hitch.

Further, by momentarily displacing dog clutch 11 from its idle position, power take-off shaft 13 can be rotated, so that a drive shaft of some implement coupled to the hitch can be brought into locking fit with a terminal connector 26 at the distal end of PTO shaft 13. In this way, any preparations for field operation of the tractor that do not require the driving power of combustion engine 1 can be carried out efficiently while combustion engine 1 is off.

In field operation, when combustion engine 1 is working, electric machine 21 works as a motor or as a generator, depending on the circumstances. Whenever the power demand of the wheel shaft 4 or of an implement connected to power take-off shaft 13 rises strongly, electric machine 21 can be temporarily operated as a motor, in order to avoid fast and energy-inefficient load transitions of combustion engine 1.

The electric machine 21 is operated as a generator whenever controller 27 detects a deficient charging state of battery 25. Further, regardless of the charging state of the battery, electric machine 21 should work as generator whenever controller 27 detects that the driver is pressing a brake pedal or combustion engine 1 is running in brake mode.

The following list of reference signs of various elements mentioned above is included (as follows), for ease of explanation:

REFERENCE NUMERALS 1 internal combustion engine
2 gearbox
3 drive shaft
4 wheel shaft
5 wheel
6 differential gear
7 clutch
8 second shaft
9 gearwheel
10 second gearbox
11 dog clutch
12 gearwheel
13 gearwheel
14 PTO shaft
15 gearwheel
16 gearwheel
17 hydraulic pump 18 shaft
19 gearwheel
20 layshaft
21 electric machine
22 clutch
23 compressor
24 converter
25 battery
26 terminal connector
27 controller
28 belt As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural vehicle comprising an internal combustion engine, an electric machine for driving a powertrain and a plurality of devices including a wheel shaft that are selectively drivable by the powertrain, the powertrain comprising:
   a first section associated to the internal combustion engine and to the wheel shaft,
   a second section, and
   a first clutch for coupling the first and second sections,
   wherein the electric machine and at least one of the plurality of devices are associated to the second section,
   wherein the electric machine is operable as a generator driven by the powertrain to generate electrical energy,
   wherein the generated electrical energy is stored in a battery, and
   wherein at least one of the plurality of devices is drivable by the electrical machine when the internal combustion engine is off.

2. The agricultural vehicle of claim 1, wherein the at least one device is an air conditioning unit.

3. The agricultural vehicle of claim 1, wherein the at least one device is a hydraulic pump.

4. The agricultural vehicle of claim 3, further comprising a lifting unit driven by the hydraulic pump.

5. The agricultural vehicle of claim 1, wherein the at least one device is a power take-off shaft.

6. The agricultural vehicle of claim 1, wherein a second clutch delimits first and second subsections of the second section, the first clutch and the electric machine are associated to the first subsection and the at least one device is associated to the second subsection.

7. The agricultural vehicle of claim 1, wherein the electric machine is operable as a generator driven by the powertrain.

8. The agricultural vehicle of claim 7, further comprising a controller for operating the electric machine as a generator whenever the agricultural vehicle is in a brake mode.

9. The agricultural vehicle of claim 7, further comprising an electric power outlet powered by the electric machine.

10. The agricultural vehicle of claim 1, wherein the battery supplies the stored electrical energy to the electrical machine to drive the at least one of the plurality of devices when the internal combustion engine is off.

11. A method of operating an agricultural vehicle comprising an internal combustion engine, an electric machine for driving a powertrain, a plurality of devices including a wheel shaft, which devices are selectively drivable by the powertrain, a converter and a battery, wherein the electric machine is operable as a generator in a first mode of operation and is operable as a motor in a second mode of operation, the method comprising the steps of
   driving the electric machine by the internal combustion engine for generating the electrical energy and, storing the electrical energy from the electrical machine in the battery in cooperation with the converter in the first mode of operation, and
   driving at least one of the plurality of devices using the electric machine and the electrical energy stored in the battery in cooperation with the convertor in the second mode of operation while the internal combustion engine is off.

12. The method of claim 11, wherein the wheel shaft is driven only in the first mode of operation.

* * * * *